April 20, 1948.  W. A. BRECHT  2,439,919
FLEXIBLE DRIVE
Filed March 3, 1945
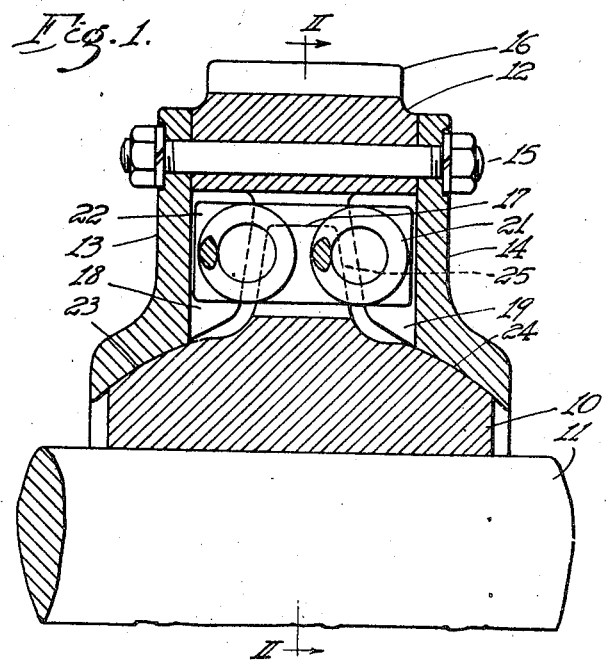
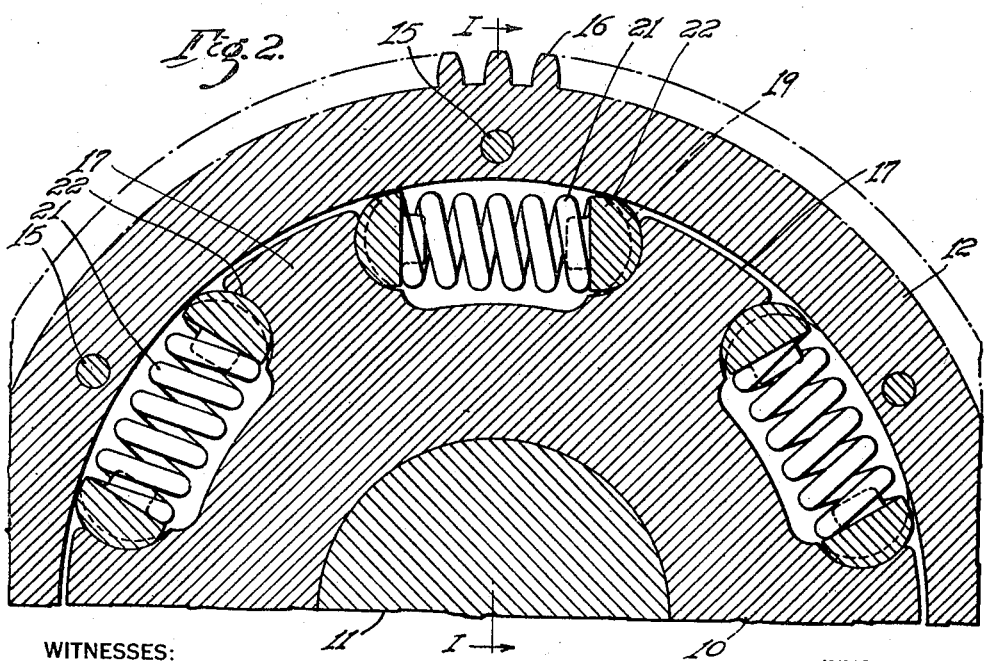
WITNESSES:
INVENTOR
Winston A. Brecht.
BY
ATTORNEY Patented Apr. 20, 1948

2,439,919

UNITED STATES PATENT OFFICE 2,439,919

FLEXIBLE DRIVE

Winston A. Brecht, Forest Hills, Pa., assignor to Westinghouse Electric Corporation, East Pittsburgh, Pa., a corporation of Pennsylvania Application March 3, 1945, Serial No. 580,800

5 Claims. (Cl. 64—15)

My invention relates, generally, to flexible gears and, more particularly, to flexible gears of the self-aligning type.

For certain applications, such as in the gear drive for a turbine locomotive in which two or more axles are tied together through the driving mechanism, it is necessary to utilize gears having torsional flexibility in order to provide for some slight variations in wheel diameters. It is also necessary to provide for misalignments between the axles and the gear shafts during operation of the locomotive over uneven track.

An object of my invention, generally stated, is to provide a flexible gear which shall be simple and efficient in operation, and which may be economically manufactured and installed.

A more specific object of my invention is to provide a flexible gear which will permit a predetermined amount of misalignment of the interconnected shafts without affecting the meshing of the gear teeth.

Another object of my invention is to provide a gear having a relatively large amount of torsional flexibility.

Other objects of my invention will be explained fully hereinafter or will be apparent to those skilled in the art.

In accordance with one embodiment of my invention, the center and the rim of a gear are provided with spherical engaging surfaces which permit universal movement of the center relative to the rim. Torsional flexibility is obtained by providing a plurality of coil springs disposed between seats which are engaged by lugs on the gear center and ears on side plates of the gear rim.

For a fuller understanding of the nature and objects of my invention, reference may be had to the following detailed description, taken in conjunction with the accompanying drawing, in which:

Figure 1 is a view, in section, of a gear embodying my invention, the section being taken along the line I—I of Fig. 2; and Fig. 2 is a view, in section, taken along the line II—II of Fig. 1.

Referring to the drawing, the structure shown therein comprises a gear center 10, which may be secured to a shaft or axle 11 in the usual manner, and a gear rim 12, which is retained in position on the gear center 10 by removable side plates 13 and 14 which are secured to the rim 12 by a plurality of through bolts 15. The rim 12 is provided with the usual gear teeth 16.

In order to obtain torsional flexibility in the gear, the gear center 10 is provided with a plurality of equally spaced, radially extending lugs 17 which are interposed between, and spaced from, laterally extending ears 18 and 19 on the side plates 13 and 14, respectively. Helical springs 21 are disposed between semi-cylindrical seats 22, which are engaged by the lugs 17 and the ears 18 and 19.

As shown most clearly in Fig. 1, each spring seat 22 bridges a pair of oppositely disposed ears 18 and 19 and one of the interposed lugs 17. Thus, the springs 21 are always under compression regardless of the direction of operation of the gear. The amount of movement of the gear rim relative to the gear center is determined by the torque to be transmitted and the strength of the springs 21. As shown, two springs are disposed between each pair of spring seats. The number of springs utilized will depend upon the width of the gear and the load to be carried.

In order to permit misalignment between the axle 11 and the shaft which carries the gear that meshes with the teeth 16, the gear center 10 and the side plates 13 and 14 are provided with spherical engaging surfaces 23 and 24, respectively. Thus, the axle 11 may be displaced without affecting the meshing of the gear teeth 16 with the teeth on the mating gear. The amount of displacement is limited by the space 25 provided between the ears 18 and 19 and the lugs 17.

The present gear is particularly suitable for utilization in gear drives of the type disclosed in my copending application, Serial No. 580,799, filed March 3, 1945. The aforesaid gear drive may be utilized for transmitting the torque of a turbine to the driving axles of a locomotive, which axles may move vertically a predetermined amount in the locomotive truck frame.

It will be noted that the present gear may be readily assembled by securing the gear center 10 to the axle 11, placing the springs 21 in the seats 22, and then securing the rim 12 in position by bolting the side plates 13 and 14 in position on the gear center by inserting the bolts 15 through the side plates and the gear rim.

The present gear permits a limited amount of universal movement between the gear center and the gear rim and has sufficient torsional flexibility for utilization in a gear drive of the type described in my aforesaid copending application. Furthermore, the gear may be readily manufactured and assembled, and, if necessary, may be dismantled for the replacement of parts.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. A gear comprising, a gear center having a plurality of radially extending lugs, a gear rim having removable side plates for retaining the rim in position, said side plates and said gear center having spherical engaging surfaces, laterally extending ears on said side plates, and spring members cooperating with said lugs and said ears to permit limited universal movement between the gear rim and the gear center.

2. A gear comprising, a gear center having a plurality of radially extending lugs, a gear rim having removable side plates for retaining the rim in position, said gear center and said side plates having spherical engaging surfaces, said side plates having laterally extending ears disposed on opposite sides of said lugs, and spring members cooperating with said lugs and said ears to permit limited universal movement between the gear rim and the gear center.

3. A gear comprising, a gear center having a plurality of radially extending lugs, a gear rim having removable side plates for retaining the rim in position, said gear center and said side plates having spherical engaging surfaces, said side plates having laterally extending ears disposed on opposite sides of and spaced from said lugs, and spring members cooperating with said lugs and said ears to permit limited universal movement between the gear rim and the gear center.

4. A gear comprising a gear center having a plurality of radially extending lugs, a gear rim having removable side plates for retaining the rim in position, said gear center and said side plates having spherical engaging surfaces, said side plates having laterally extending ears disposed on opposite sides of and spaced from said lugs, spring members cooperating with said lugs and said ears to permit limited universal movement between the gear rim and the gear center, and spring seats for said spring members, each one of said spring seats being engaged by a pair of said oppositely disposed ears and the interposed lug on the gear rim.

5. A gear comprising, a gear center having a plurality of radially extending lugs, a gear rim having removable side plates for retaining the rim in position, said gear center and said side plates having spherical engaging surfaces, said side plates having laterally extending ears disposed on opposite sides of and spaced from said lugs, spring members cooperating with said lugs and said ears to permit limited universal movement between the gear rim and the gear center, and spring seats for said spring members, each one of said spring seats being engaged by a plurality of spring members and a pair of said oppositely disposed ears and the interposed lug on the gear rim.

WINSTON A. BRECHT.

REFERENCES CITED

The following references are of record in the file of this patent:

UNITED STATES PATENTS

| Number | Name | Date |
| --- | --- | --- |
| 746,583 | Saxon | Dec. 8, 1903 |
| 813,204 | Frayer et al. | Feb. 20, 1906 |
| 1,254,542 | Schwinn | Jan. 22, 1918 |
| 1,258,631 | Elers | Mar. 5, 1918 |
| 1,580,769 | Uggla | Apr. 13, 1926 |

FOREIGN PATENTS

| Number | Country | Date |
| --- | --- | --- |
| 379,713 | Germany | 1923 |